(12) United States Patent  (10) Patent No.: US 9,625,004 B2
Smith et al.  (45) Date of Patent: Apr. 18, 2017

(54) CONNECTING LINK PIN RETAINING DEVICE

(71) Applicant: Delmar Systems, Inc., Broussard, LA (US)

(72) Inventors: Matthew W. Smith, Houston, TX (US); Michael Arnaud, Carencro, LA (US)

(73) Assignee: DELMAR SYSTEMS, INC., Broussard, LA (US)

( * ) Notice: Subject to any disclaimer, the term of this patent is extended or adjusted under 35 U.S.C. 154(b) by 0 days.

(21) Appl. No.: 15/021,956

(22) PCT Filed: Sep. 18, 2014

(86) PCT No.: PCT/US2014/056209
§ 371 (c)(1),
(2) Date: Mar. 15, 2016

(87) PCT Pub. No.: WO2015/042218
PCT Pub. Date: Mar. 26, 2015

(65) Prior Publication Data
US 2016/0223054 A1 Aug. 4, 2016

Related U.S. Application Data

(60) Provisional application No. 61/879,193, filed on Sep. 18, 2013.

(51) Int. Cl.
*F16G 15/06* (2006.01)
*F16G 15/02* (2006.01)
(Continued)

(52) U.S. Cl.
CPC .............. *F16G 15/02* (2013.01); *B23P 19/04* (2013.01); *B63B 21/20* (2013.01); *B63C 11/52* (2013.01);
(Continued)

(58) Field of Classification Search
CPC .......... F16G 15/06; F16G 15/04; B23P 19/04; B66C 1/36; B66C 1/34; B36C 11/52
(Continued)

(56) References Cited

U.S. PATENT DOCUMENTS 7,134,268 B2 * 11/2006 Siappas ................... F16G 15/06
59/85
7,895,817 B2 * 3/2011 Grenga ................... F16G 15/04
59/85

(Continued)

*Primary Examiner* — David B Jones
(74) *Attorney, Agent, or Firm* — Law Office of Jesse D. Lambert, LLC

(57) ABSTRACT

A connecting link pin retaining device has main frame with a lead screw threadably engaged with the main frame. The main frame has opposing upper and lower sections, and is sized and shaped to fit around a connecting link, typically used in connecting sections of mooring lines in subsea mooring applications. The retaining device is positioned around a connecting link, subsea, by a Remotely Operated Vehicle ("ROV"), and the main frame engages the connecting link and positions the lead screw in alignment with the connecting link pin of the connecting link. The lead screw is then rotated by an operating arm of the ROV, advancing the end of the lead screw against the connecting link pin and retaining it in place.

14 Claims, 12 Drawing Sheets

(51) Int. Cl.
*F16G 15/04* (2006.01)
*B23P 19/04* (2006.01)
*B66C 1/36* (2006.01)
*B63B 21/20* (2006.01)
*B63C 11/52* (2006.01)

(52) U.S. Cl.
CPC ............... *B66C 1/36* (2013.01); *F16G 15/04* (2013.01); *F16G 15/06* (2013.01)

(58) Field of Classification Search
USPC ....................................................... 59/85, 86
See application file for complete search history.

(56) References Cited

U.S. PATENT DOCUMENTS

| | | | |
|---|---|---|---|
| 8,539,747 B2 * | 9/2013 | Abrisketa Lozano | F16G 15/06 294/82.1 |
| 9,067,660 B2 * | 6/2015 | Van Steijn | F16G 15/06 |
| 9,382,970 B1 * | 7/2016 | Teichmiller | F16G 15/06 |

* cited by examiner

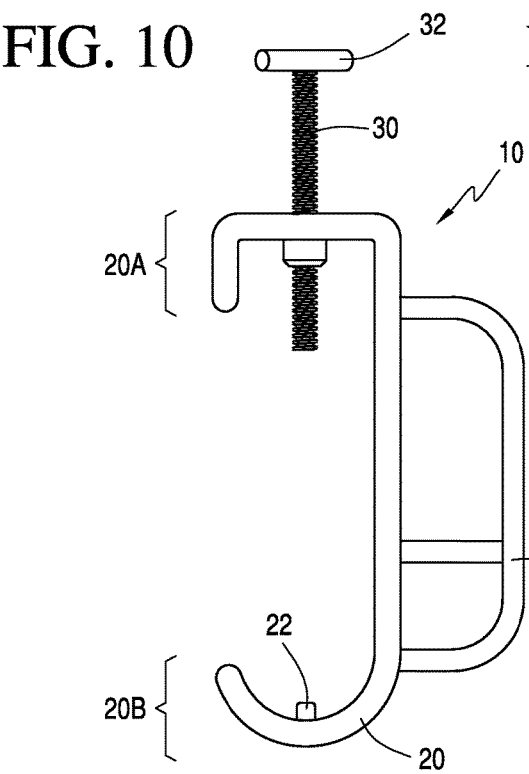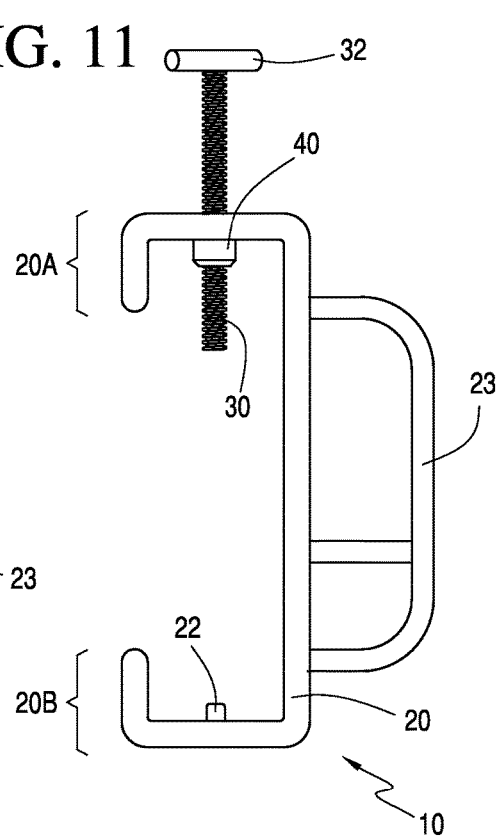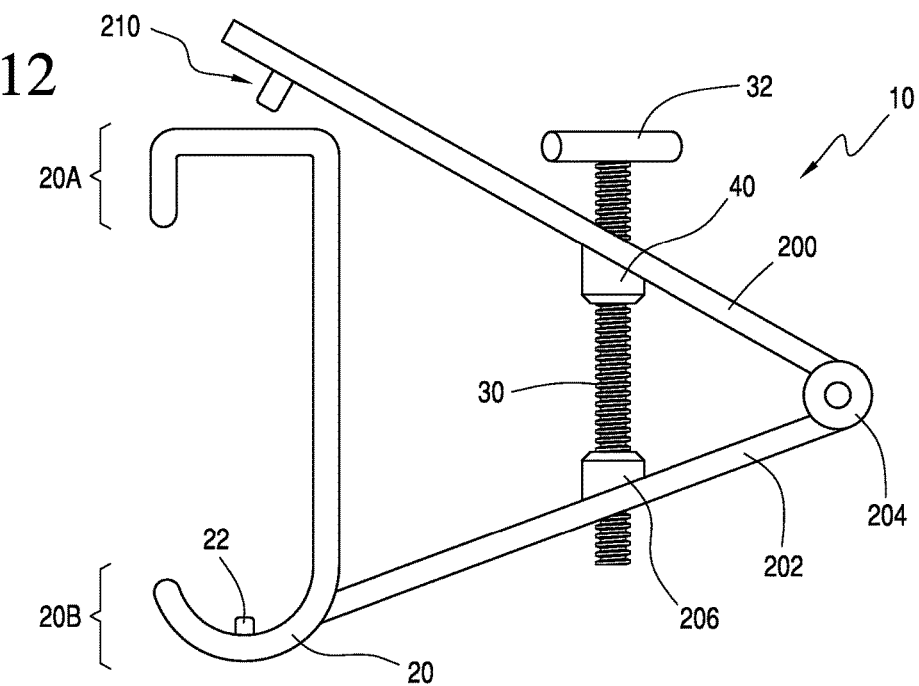

CONNECTING LINK PIN RETAINING DEVICE

CROSS REFERENCE TO RELATED APPLICATIONS

This regular patent application claims priority to U.S. Provisional Patent Application Ser. No. 61/879193, filed Sep. 18, 2013, for all purposes. The disclosure of that application is incorporated herein, to the extent that is consistent with this application.

BACKGROUND

This invention relates to apparatus and method for connecting chains, cables and the like typically used to moor vessels offshore, such as mobile offshore drilling units (MODUs), floating production vessels, or other similar vessels. A typical mooring installation has the vessel secured to a plurality of anchors on or embedded in the seafloor, by flexible connecting members such as chains, cables, synthetic lines, or some combination thereof. For purposes of this application, all such flexible connecting members will be referred to as "chains" or "lines."

Sections of line may be joined by members commonly known as "connecting links," as is well known in the art. FIG. 1 shows an exemplary prior art connecting link 100. Connecting link 100 may be disassembled, the links of two other connectors or lines hooked into connecting link 100, then when connecting link 100 is reassembled it joins the two lengths of line. Primary parts of connecting link 100 are a generally C-shaped main body 102, a pair of mating caps 104 and 106, a link pin 108, and a retaining plug 110. As seen in FIG. 1, an opening O exists between the separated ends or ears 114 of main body 102. As is well known in the art, caps 104 and 106 fit together around main body 102, in particular having internal profiles 120 which mesh with the profiles 112 on the open ears 114, proximal opening O. Link pin 108 is then inserted through a hole 105 created by meshed caps 104 and 106, through holes 104A and 106A in overlapping members within meshed caps 104 and 106 (thus holding the caps together), and then into a hole 116 in connecting link 100, thus holding the caps together, and retaining the caps on connecting link 100. Hole 116 typically runs completely through main body 102, to emerge in a lower end of hole 116 at the bottom of main body 102.

A protrusion 107 on one of the caps, e.g. cap 106, typically fits into a key slot 109 in main body 102. Typically, a retaining plug 110 is then inserted on top of link pin 108 and within a cavity 118 at the uppermost section of the hole 105 formed by the meshed caps 104 and 106. Retaining plug 110 may be made of a soft metal such as lead, and may be simply hammered in place or preferably melted and cast in place, for improved retention. These methods and apparatus (i.e. the structure of the connecting link and how it is assembled) are all known in the art.

As can be understood by this description, the integrity of the connecting link assembly is dependent upon link pin 108 remaining in place and holding caps 104 and 106 in place on main body 102. Link pin 108 is typically simply a tapered pin (not threadably engaged), for ease of disassembly of connecting link 100. The open, lower end of hole 116 enables link pin 108 to be driven out from the bottom of main body 102, among other uses. While friction forces may be enough to hold link pin 108 in place, retaining plug 110 is important to ensure that link pin 108 remains in place.

An issue arises if retaining plug 110 comes out, and link pin 108 then begins to move out of its proper position. This situation might be revealed during underwater inspections of mooring assemblies, carried out by Remotely Operated Vehicles (ROVs), as is known in the art. If that happens, there is no known prior art apparatus and/or method by which link pin 108 can be pushed back into proper position, and retained in its proper position, which can be deployed and implemented subsea by an ROV.

SUMMARY OF THE INVENTION

A connecting link pin retaining device according to the principles of the present invention fits around a connecting link and serves to move an out-of-position link pin back into its proper position, and to retain it in that position or to simply prevent a link pin from moving out of its proper position. The connecting link pin retaining device comprises a frame and a means for moving a retaining member against the link pin, operable by a lead screw turned by an ROV. According to one embodiment of the present invention, the means for moving a retaining member against the link pin comprises a lead screw mounted in the frame, the lead screw adapted to be rotated by an operating arm of an ROV, and thus moved against the link pin and held by a self-locking mechanism. The frame comprises opposing upper and lower sections, and may be generally C-shaped, in side view, to partially wrap around the connecting link. The lead screw is threadably engaged with the frame, for example disposed in a threaded nut in the top or upper section of the frame. The lead screw and/or the threads in which it is engaged are preferably of a design which minimizes any unwanted rotation of the lead screw within the threads, which would tend to permit the retaining device to disengage from the connecting link. For example, the threaded nut may be of a type which resists the lead screw from unscrewing once in place, for example a NYLOK® nut. Alternatively, or in addition, the lead screw may have a Nylon or similar resilient insert which engages the female threads in the threaded nut. The lead screw also has an operating handle, which may be a T-handle or other suitable shape to permit rotation by the operating arm of an ROV, and preferably has a flex joint or similar member which permits rotation of the lead screw even when the rotating arm of the ROV is not axially aligned with the lead screw. The frame preferably has a locator pin in its lower end. In use, the retaining device is positioned by an ROV such that the locator pin enters the lowermost end of the retaining pin hole in the main body of the connecting link. The frame is then rotated into place relative to the connecting link such that the lead screw is aligned with the retaining pin. The ROV then rotates the lead screw, advancing it to bear against the retaining pin and force the retaining pin back into full engagement and proper position, or to hold an in-place retaining pin in place; once rotation is stopped, the lead screw is locked in place and the retaining pin therefore held securely in its proper position. The retaining device can then be removed if desired, otherwise it can remain in place on the connecting link for some desired period of time.

BRIEF DESCRIPTION OF THE DRAWINGS

FIGS. 10 and 11 show alternative shapes of the frame, in side view.

FIG. 12 shows an alternate embodiment of a connecting link pin retaining device embodying the principles of the present invention.

DESCRIPTION OF THE PRESENTLY PREFERRED EMBODIMENT(S)

While various connecting link pin retaining tools can embody the principles of the present invention, with reference to the drawings some of the presently preferred embodiments can be described.

Figure 1:
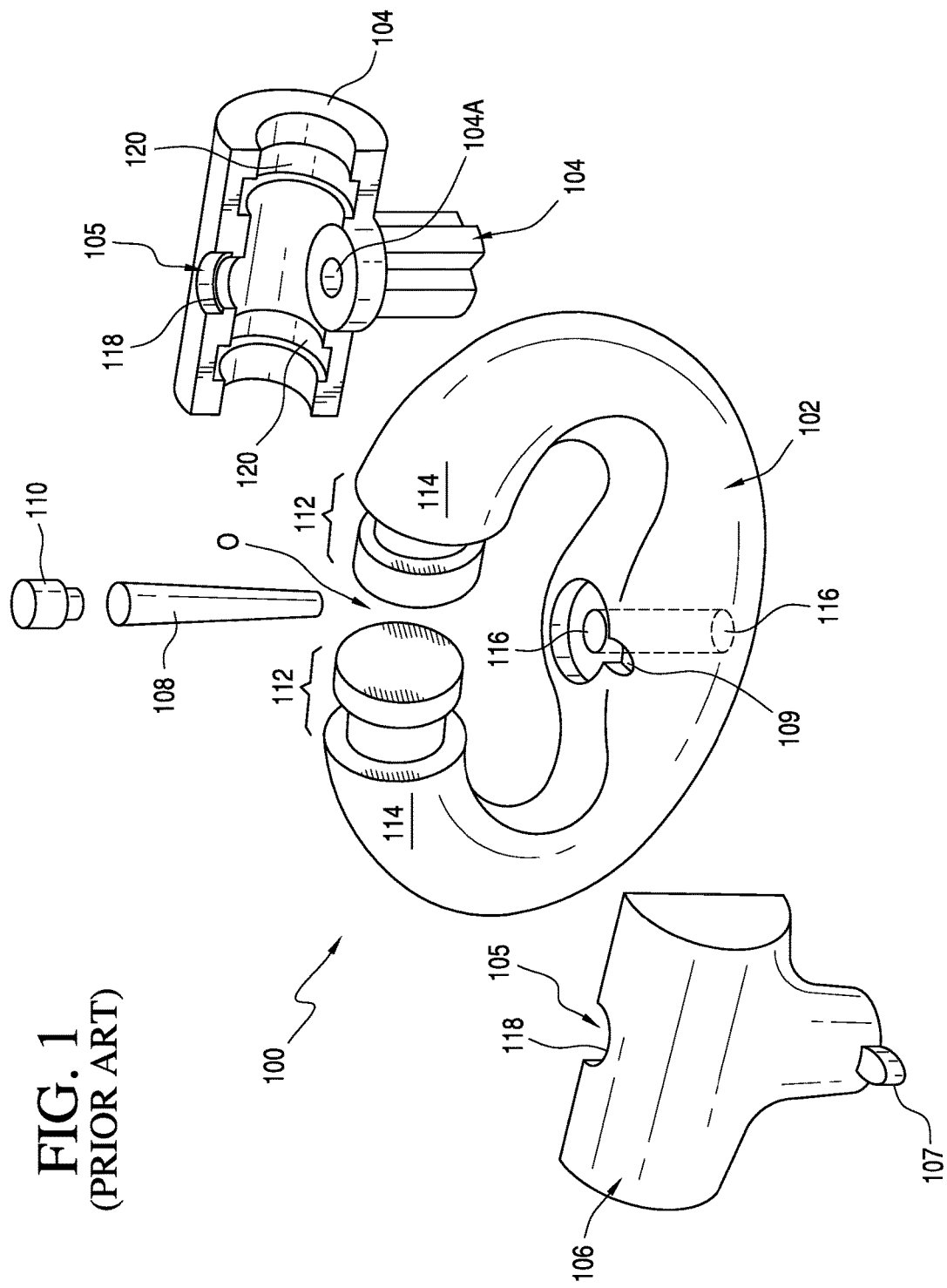
FIG. 1 is an exploded view of a prior art connecting link.

FIG. 1 shows a conventional, prior art connecting link in an exploded view, as previously described.

Figure 2:
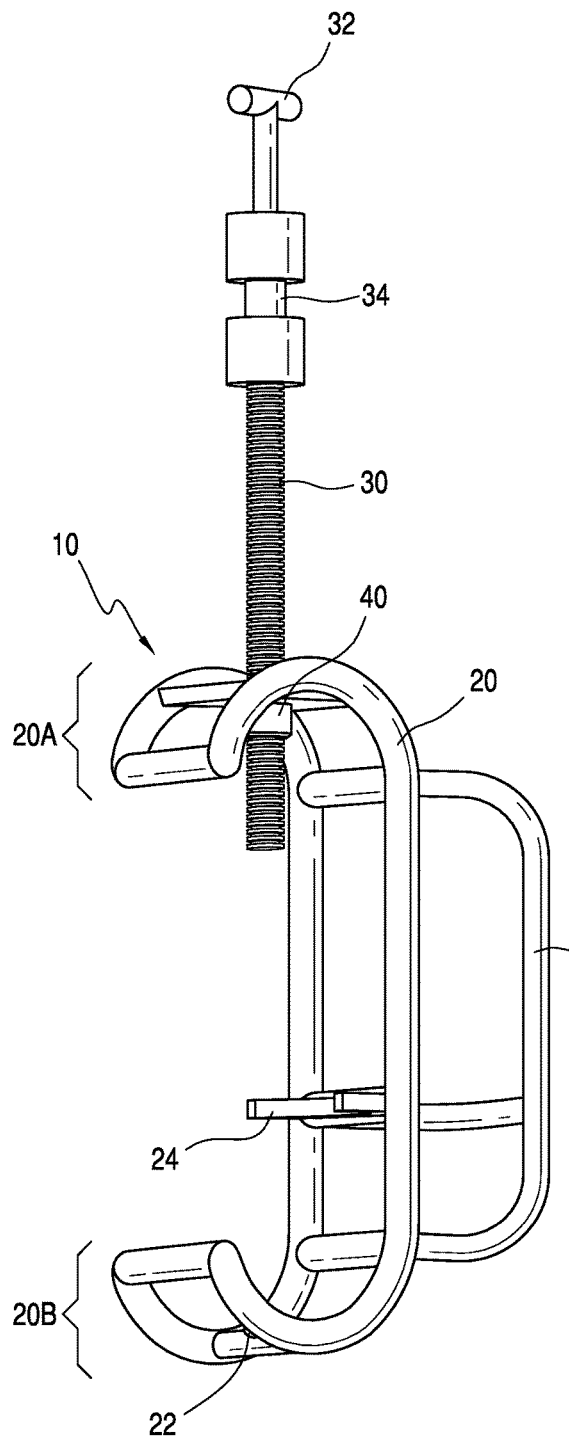
FIG. 2 is a perspective view of a connecting link pin retaining device embodying the principles of the present invention.
Figure 3:
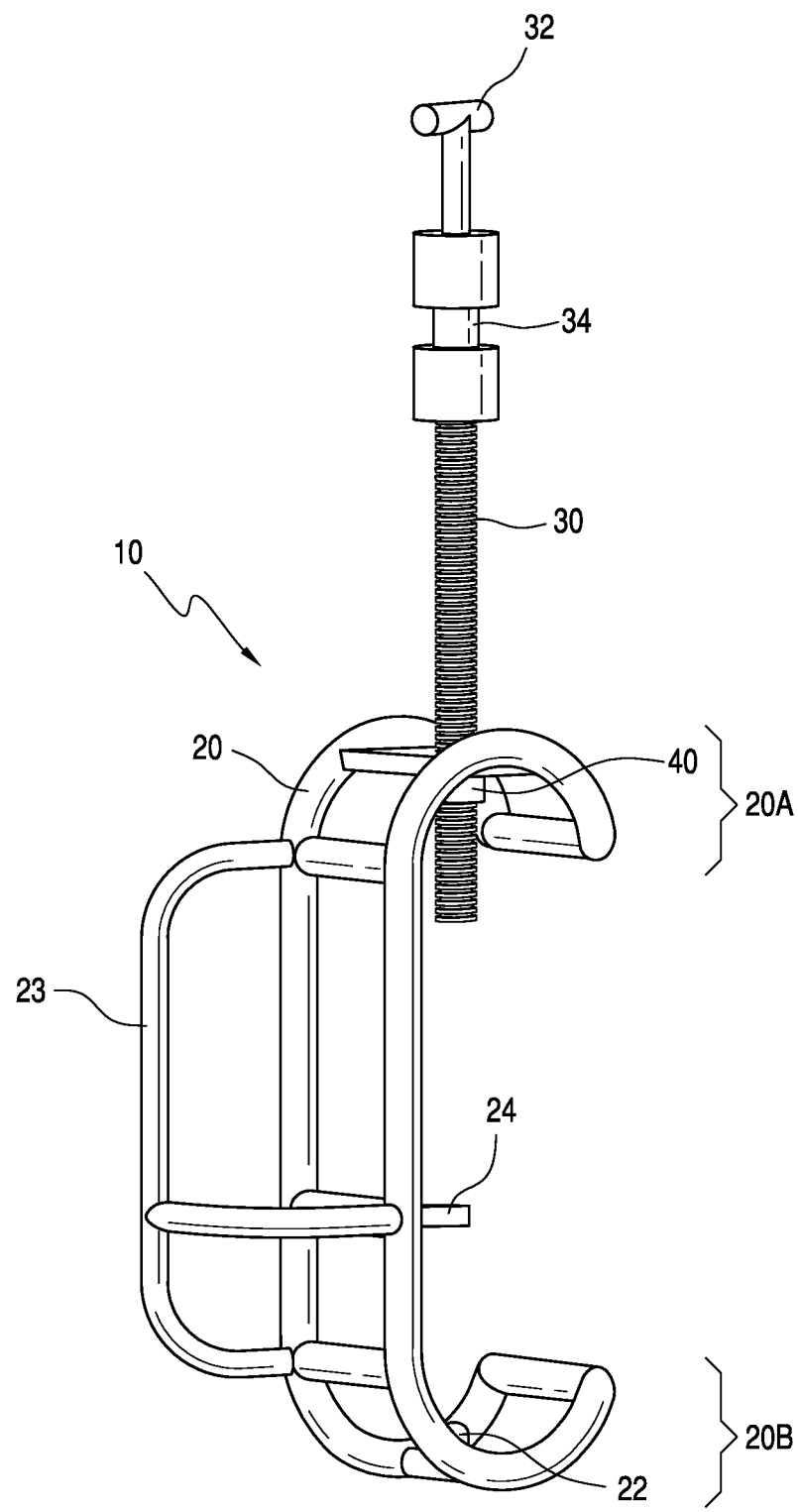
FIG. 3 is another perspective view of the connecting link pin retaining device of FIG. 2, viewed from another angle.
Figure 4:
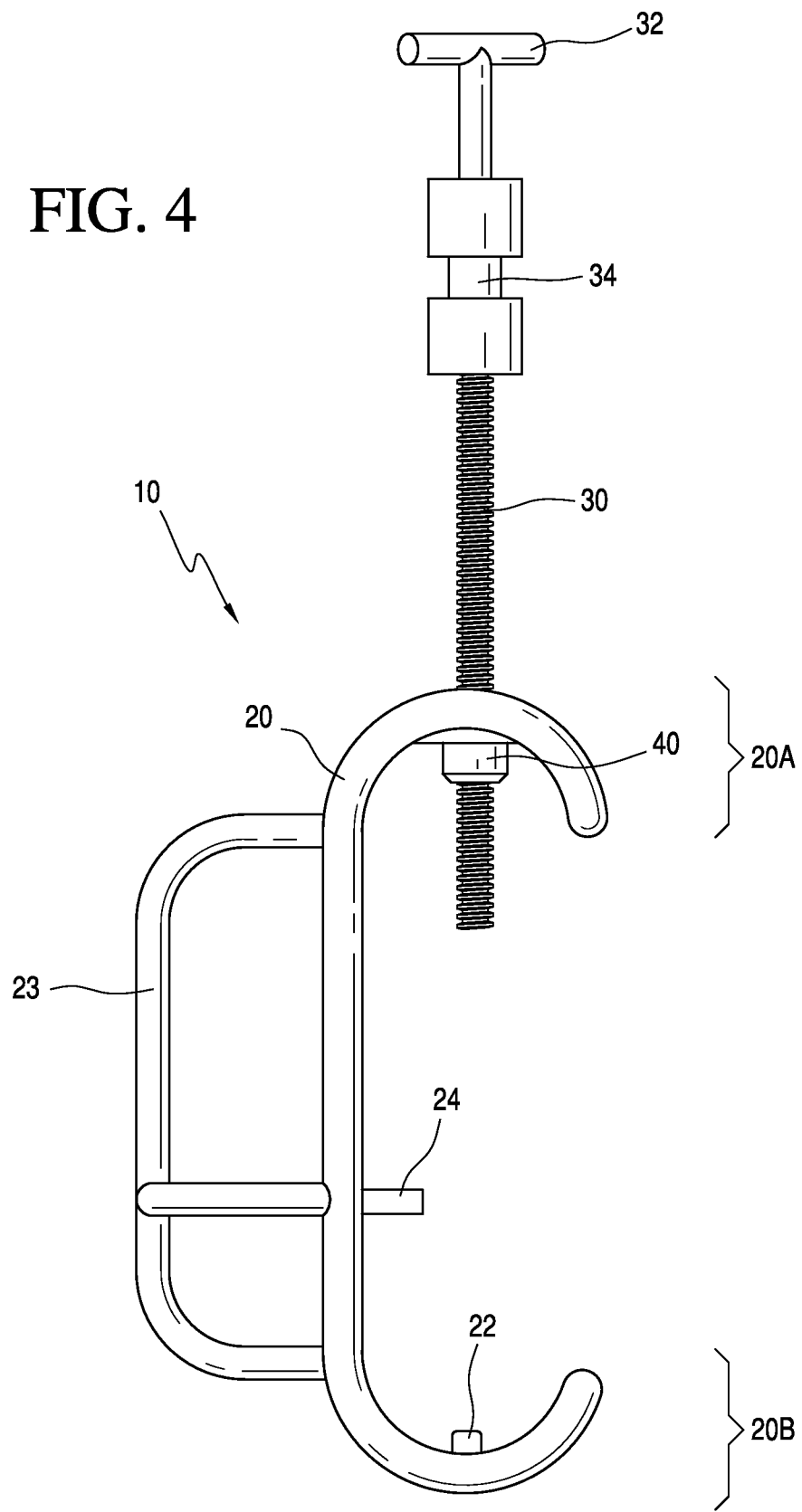
FIG. 4 is a side view of a connecting link pin retaining device embodying the principles of the present invention.

FIGS. 2, 3 and 4 show various views of one embodiment of the connecting link pin retaining device, referred to at times herein as "retaining device." With reference to those figures, retaining device 10 comprises a frame 20 and a means for moving a retaining member against a link pin. In this embodiment, the means for moving a retaining member against a link pin comprises a threaded lead screw 30, threadably engaging and mounted on main frame 20. As can be seen in the figures, in this embodiment frame 20 has opposing upper and lower sections 20A and 20B, making frame 20 generally C-shaped in side view, to fit around connecting link 100. The lower end of frame 20 preferably has a locator pin 22, which is sized and positioned to be inserted into the lowermost end of hole 116 in connecting link 100. Preferably, frame 20 has a central saddle member 24, which fits around caps 104, 106 when connecting link 100 is assembled, and serves to position and stabilize frame 20 with respect to connecting link 100. A handle section 23 can be easily grasped by an operating arm of an ROV.

Figure 2A:
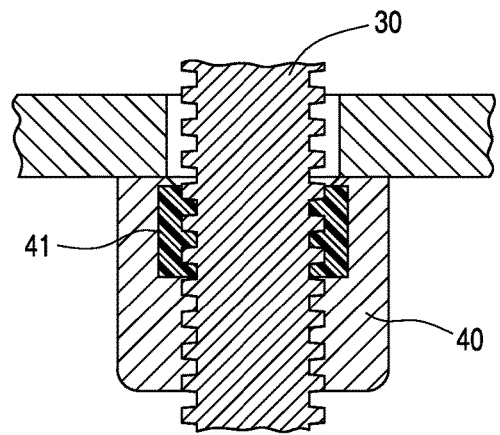
FIG. 2A is a detailed section view of the lead screw engaged with a locking nut.

Lead screw 30 is threadably engaged with frame 20 by a threaded means, for example via nut 40, which in turn is mounted on frame 20. Rotation of lead screw 30 advances and retracts lead screw with respect to frame 20. Lead screw 30 preferably has an operating handle 32, which may be a T-handle or other suitably shaped handle, to enable grasping and rotation by an operating arm of an ROV. Further, lead screw 30 preferably comprises a flex joint 34, for example positioned between operating handle 32 and the threaded portion of lead screw 30, so that lead screw 30 can be rotated by an operating arm of an ROV even if the operating arm is not axially aligned with lead screw 30. The engagement of lead screw 30 with the threaded means is preferably locking, so that lead screw 30 will not rotate except when intentionally rotated by an ROV. A means for locking lead screw 30 in place is preferably provided; in one embodiment, nut 40 is preferably of the self-locking variety, with a nylon or similar self locking element, for example a NYLOK® or similar type nut. FIG. 2A is an expanded view of lead screw 30 positioned within nut 40, showing the threads of each element engaged with each other. The nylon or similar self locking insert is represented as element 41.

Figure 2B:
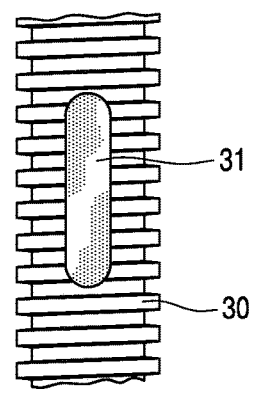
FIG. 2B shows a self-locking insert in the lead screw.

Alternatively, a locking insert could be mounted within the threads of lead screw 30, as illustrated by insert 31 in FIG. 2B. Similar to insert 41, insert 31 may be of nylon or other suitable material known in the art.

Figure 5:
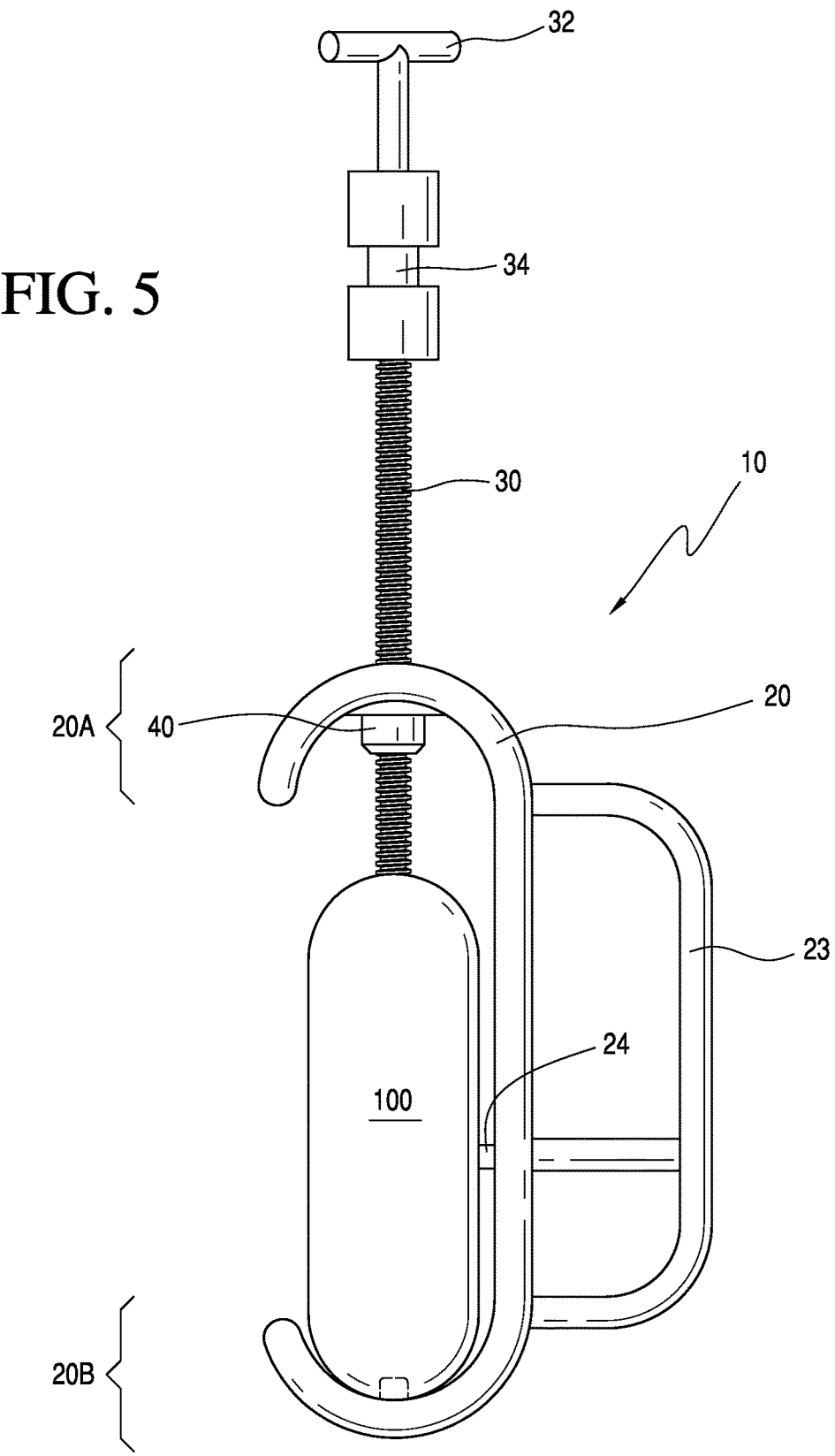
FIG. 5 is a side view of the retaining device, in place on a connecting link.

FIG. 5 is a view of retaining device 10 in place on a connecting link 100, viewed down the long axis of connecting link 100 and showing a side view of retaining device 10. Lead screw 30 has been advanced to contact retaining plug 110 or link pin 108, thus securely holding same in place.

Figure 6:
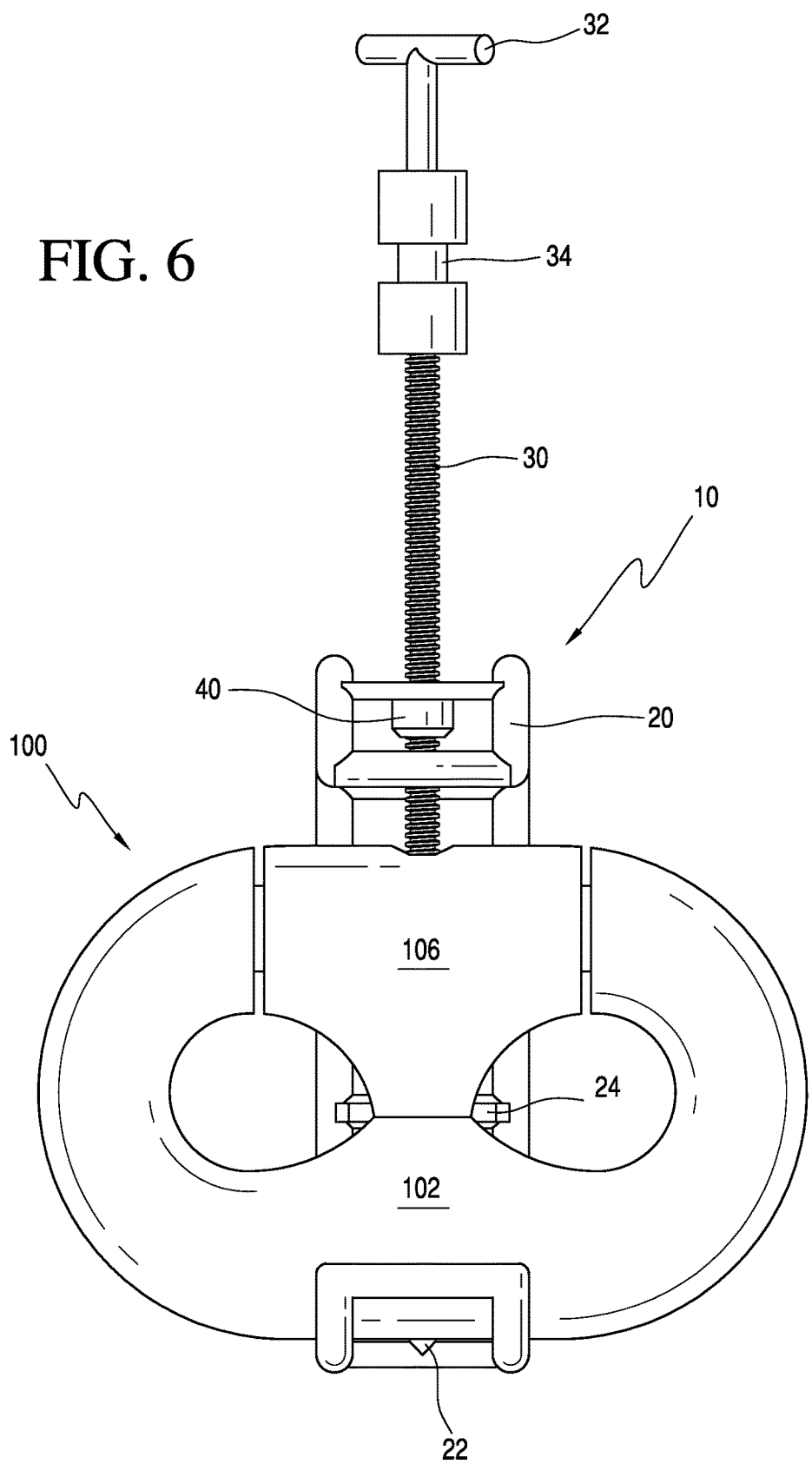
FIG. 6 is a front view of the retaining device, in place on a connecting link.
Figure 7:
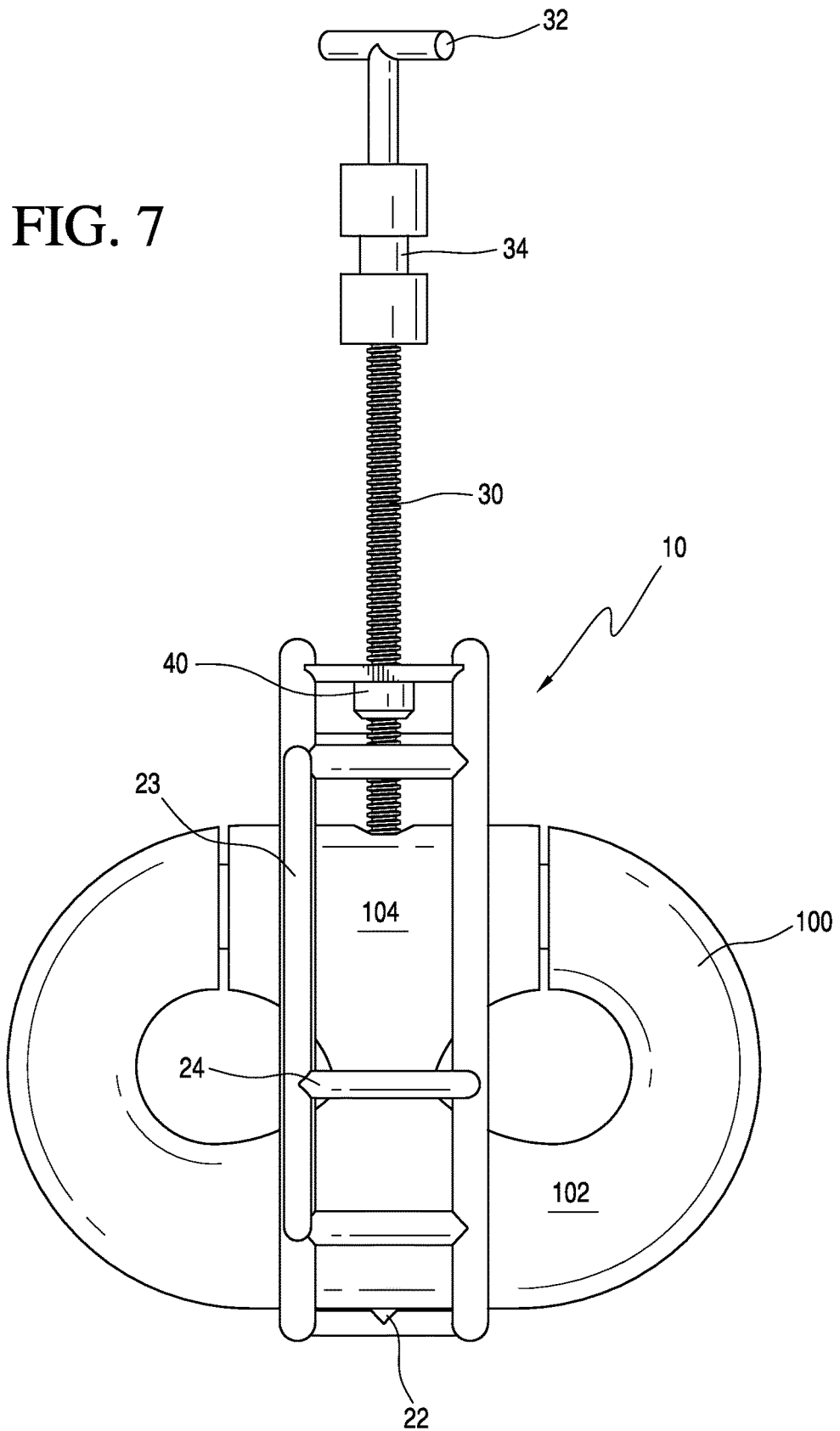
FIG. 7 is a view of the retaining device in place on a connecting link, as in FIG. 6, viewed from a 180 degree rotation.
Figure 8:
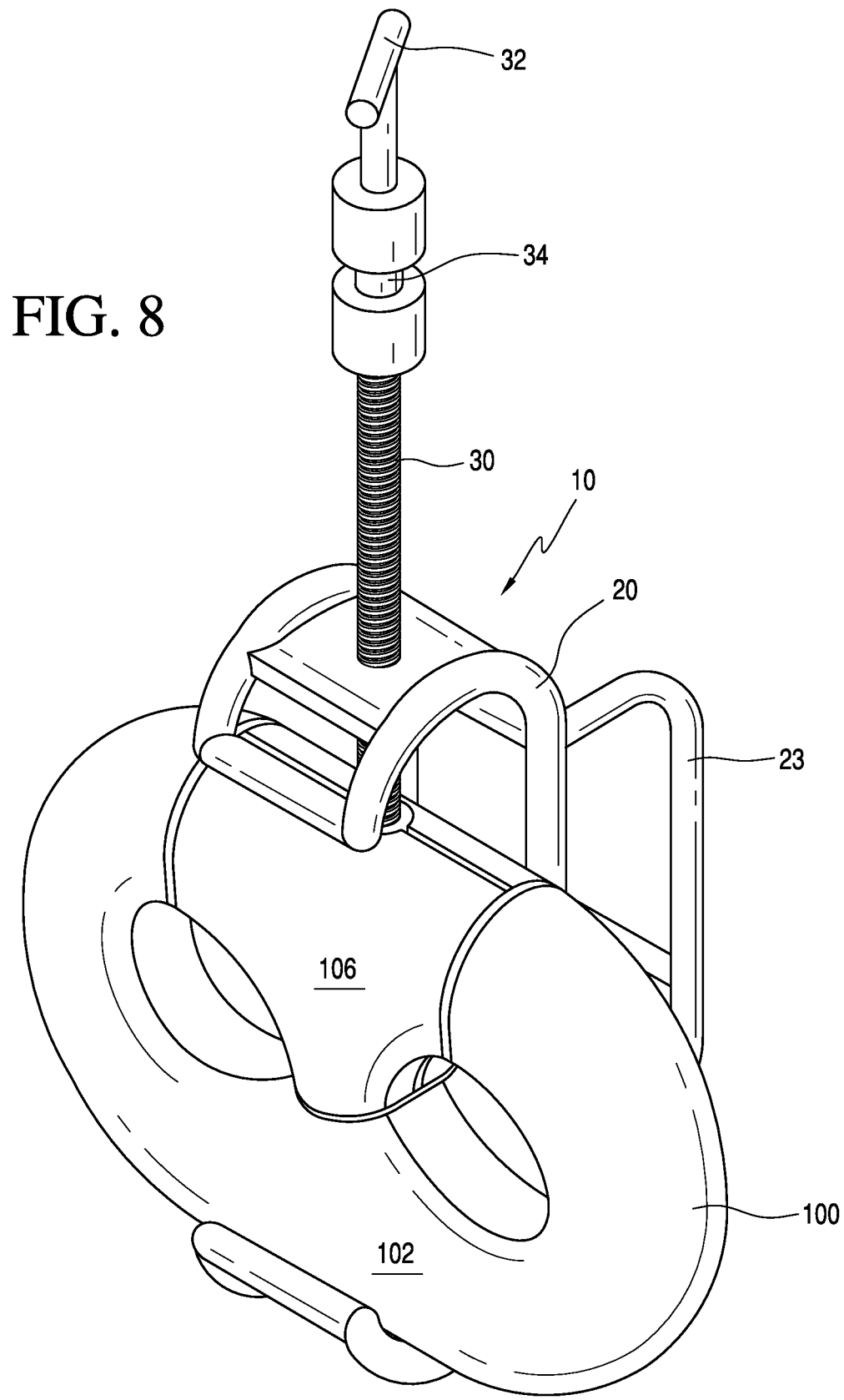
FIG. 8 is a perspective view of the retaining device in place on a connecting link.

FIGS. 6 and 7 are front and rear views of retaining device 10 in place on a connecting link 100. The lower section 20B of frame 20 fits around the lower side or bottom of connecting link 100, with locator pin 22 fitting within the lower end of the retaining pin hole 116 in connecting link 100. As can be seen in FIG. 6 and more distinctly in FIG. 7, saddle member 24 fits around the central portion of meshed together caps 104 and 106 and aids in aligning and stabilizing retaining device 10 with respect to connecting link 100. Lead screw 30, as in FIG. 5, is advanced so as to bear against retaining plug 110 or link pin 108. FIG. 8 is a perspective view corresponding to FIGS. 6 and 7, showing retaining device 10 in place on connecting link 100.

Figure 9:
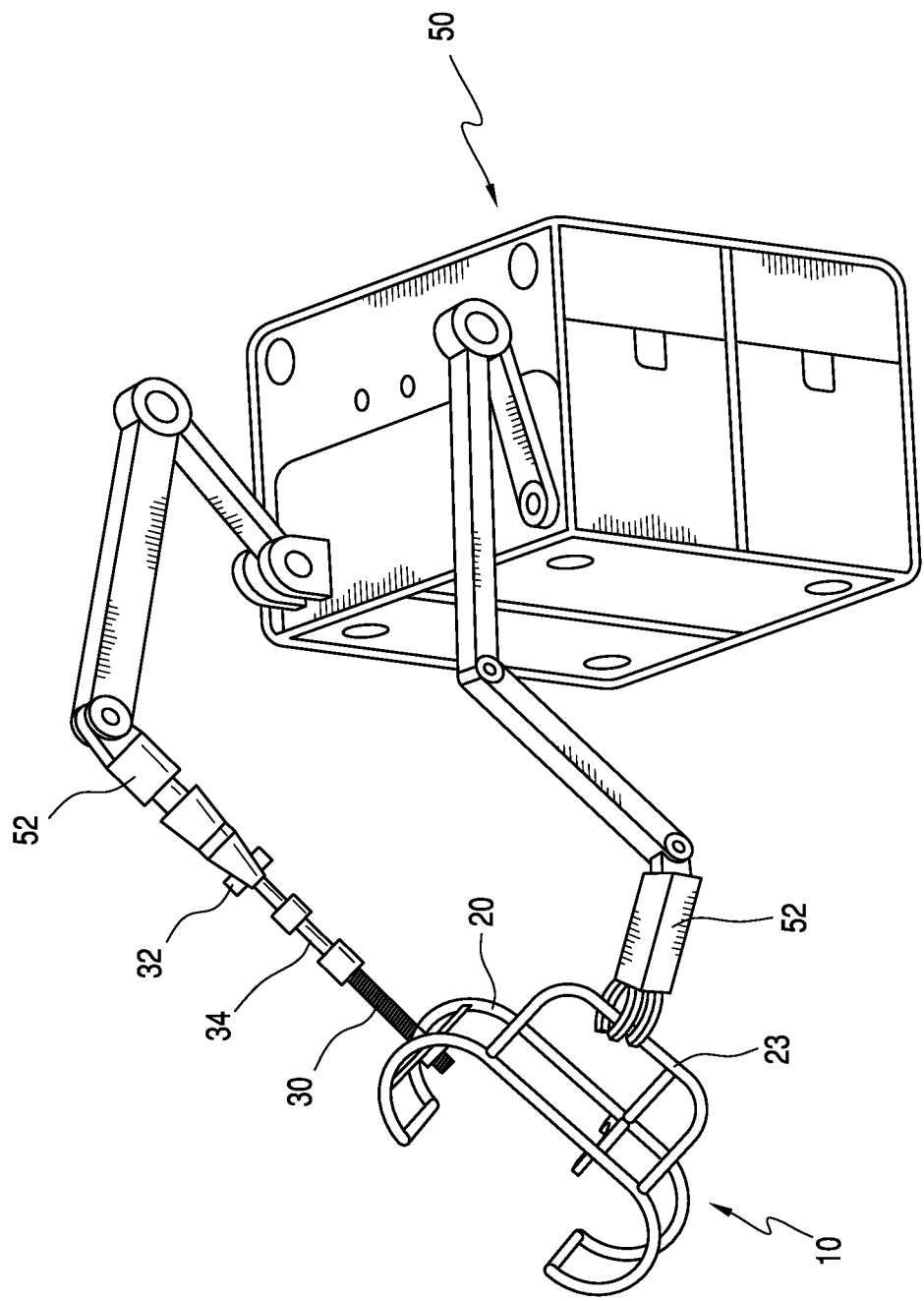
FIG. 9 is a perspective view of an exemplary ROV, in a position grasping the link pin retaining device and rotating the lead screw of the retaining device.
Figure 9A:
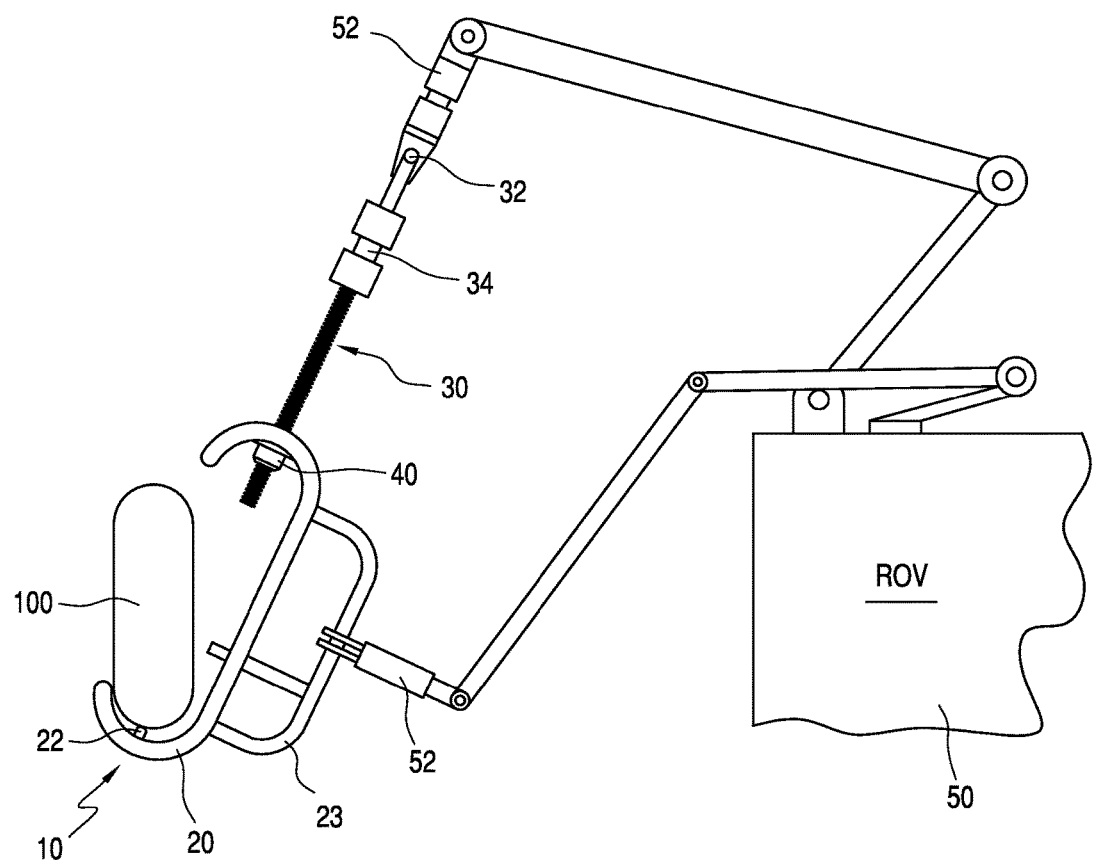
Figure 9B:
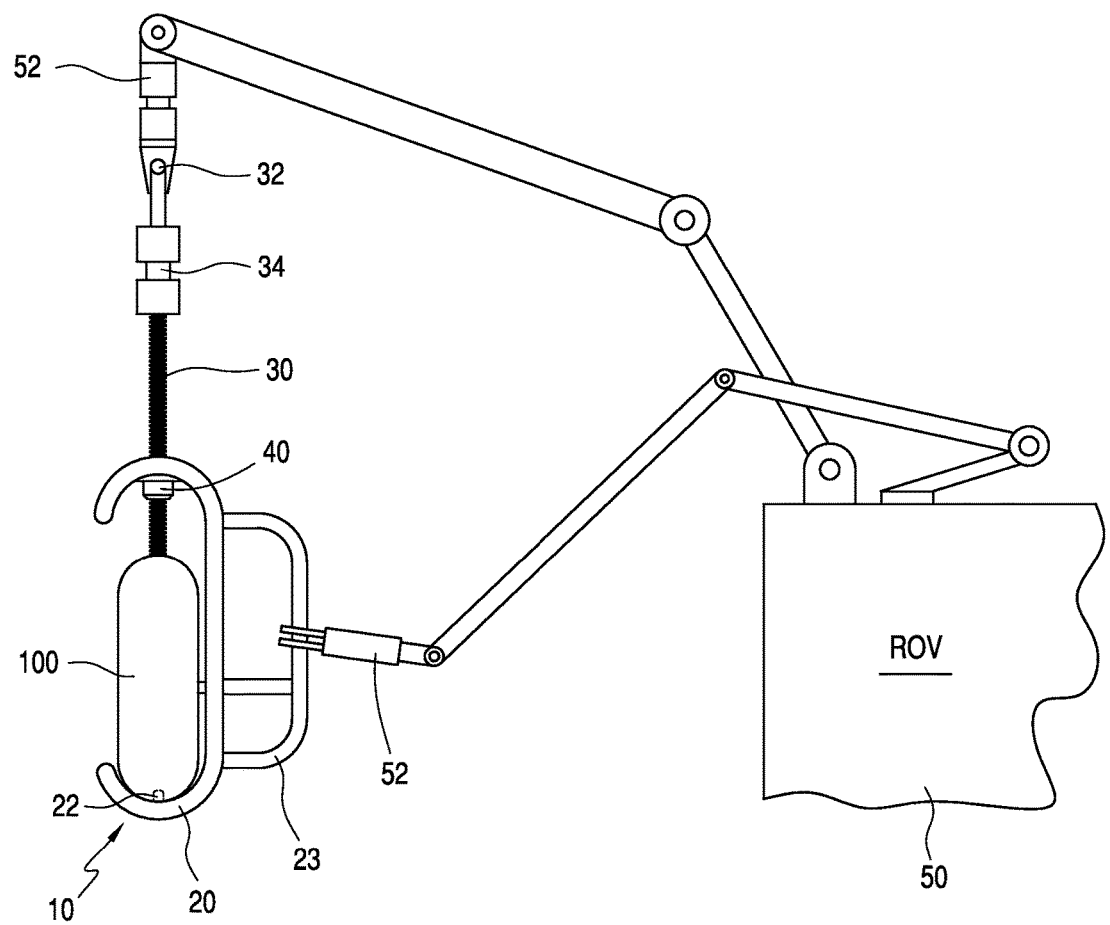

To use the device, a connecting link having an out-of-position retaining plug 110 and/or link pin 108 is first identified, typically by ROV inspection. Referring to FIGS. 9, 9A and 9B, retaining device 10 is brought into position subsea by an ROV 50, grasping retaining device 10 (preferably by handle section 23) in one of its operating arms 52. Retaining device 10 is then placed around connecting link 100, as can be seen in FIG. 9A, preferably by first inserting locator pin 22 into the lower end of hole 116 in connecting link 100, then rotated into the position shown in FIGS. 5-8 and 9B, with saddle member 24 fitting around caps 104, 106, and lead screw 30 axially aligned with retaining plug 110 and/or link pin 108. The other of operating arms 52 grasps operating handle 32 of lead screw 30, then rotates same to advance it against retaining plug 110 and/or link pin 108. As can be readily understood, retaining plug 110 and/or link pin 108 is thus held securely in place, and as a result caps 104, 106 remain locked in place and the overall integrity of connecting link 100 is preserved. As mentioned earlier, lead screw 30 is rotationally held in place and prevented from backing out, by the NYLOK® or similar locking nut element 41 in nut 40, or the corresponding element 31 in lead screw 30.

Other Embodiments

Frame 20 may be in alternate cross section shapes, in side view, for example a shape having a squared-off top section 20A as in FIG. 10, or squared off top and bottom sections 20A and 20B as in FIG. 11.

FIG. 12 shows a retaining device 10 having a alternate means for moving a retaining member against a link pin. In this embodiment, a pair of arms 200 and 202 join frame 20, and are joined by a hinge 204. A lead screw 30 is rotatably mounted in a threaded nut 40 in one of arms 200 or 202, and is connected to the other arm by a rotating mount 206. As can be seen in FIG. 12, the end of at least one of arms 200 and 202 are preferably curved to accommodate a connecting link, and rotation of lead screw 30 (via handle operating handle 32) brings arms 200 and 202 together, where a retaining member 210 bears against a link pin, as is readily understood in light of the preceding description.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example, the size and shape of frame 20 of retaining device 10 may be altered to suit particular connecting links; the end of lead screw 30 to be grasped by the ROV may be a T-handle, paddle, or other shape; and the apparatus could be used on other subsea connecting apparatus that require that a pin be held in a desired position.

Therefore, the scope of the invention is to be determined not by the illustrative examples set forth above, but by the appended claims and their legal equivalents.

We claim:

1. A connecting link pin retaining device, comprising:
a frame having a general C-shape in side view, said frame sized and shaped to fit around a connecting link disposed in a subsea mooring line, said frame having opposed upper and lower sections; and
a lead screw rotatably mounted in said upper section, said lead screw having an axis substantially aligned with a retaining pin in said connecting link, when said frame is disposed around a connecting link with said lower section of said frame bearing against a bottom of said connecting link.

2. The connecting link pin retaining device of claim 1, wherein said lead screw comprises an operating handle sized and shaped for rotation by an operating arm of a remotely operated vehicle.

3. The connecting link pin retaining device of claim 2, wherein said lead screw further comprises a flex joint.

4. The connecting link pin retaining device of claim 3, wherein said frame comprises a locator pin in said lower section, said locator pin positioned so as to fit into a link pin hole in the bottom of said connecting link, when said connecting link is positioned within said frame.

5. The connecting link pin retaining device of claim 4, wherein said frame further comprises a handle section adapted to be grasped by an operating arm of a remotely operated vehicle.

6. The connecting link pin retaining device of claim 1, further comprising a threaded nut in said upper section of said frame, and wherein said lead screw is threadably disposed in said threaded nut, said threaded nut further comprising a self-locking insert therein.

7. The connecting link pin retaining device of claim 1, further comprising a threaded nut in said upper section of said frame, and wherein said lead screw is threadably disposed in said threaded nut, said lead screw further comprising a self-locking insert disposed therein.

8. The connecting link pin retaining device of claim 1, wherein said frame further comprises a saddle member disposed between said upper and lower sections, said saddle member shaped to fit closely around a central portion of said connecting link.

9. A connecting link assembly for joining sections of a mooring line in a subsea environment, comprising:
a connecting link comprising a generally C-shaped main body having an opening between opposed ear sections, a pair of mating caps which fit together around said opposed ear sections and close said opening, and a connecting link pin inserted through mating holes in said caps and said main body; and
a connecting link pin retaining device fit around said connecting link, said connecting link pin retaining device comprising a frame having opposed upper and lower sections, said connecting link fitting between said upper and lower sections, and a means for moving a retaining member against said connecting link pin, thereby holding said connecting link pin in position relative to said connecting link.

10. The connecting link assembly of claim 9, wherein said means for moving a retaining member against said connecting link pin comprises a lead screw threadably engaged within a threaded nut mounted in said upper section of said frame, said lead screw positioned so as to be substantially aligned with said retaining pin, said lead screw rotated and advanced against said retaining pin.

11. The connecting link assembly of claim 10, wherein said lead screw comprises an operating handle adapted to be rotated by an operating arm of a remotely operated vehicle.

12. The connecting link assembly of claim 11, wherein said lead screw further comprises a flex joint, and wherein said lower section of said frame comprises a locator pin engaging a hole in said connecting link main body.

13. A method of retaining a link pin in a desired position in a connecting link, said connecting link disposed in a mooring line in a subsea environment, comprising the steps of:
a) providing a connecting link pin retaining apparatus comprising:
a frame sized and shaped to fit around said connecting link, said frame having opposed upper and lower sections and a handle section adapted for grasping by a remotely operated vehicle, said lower section of said frame further comprising a locator pin; and
a lead screw rotatably mounted in a threaded nut having a self-locking insert therein, in said upper section of said frame, said lead screw having an axis substantially aligned with a retaining pin in a connecting link when received within said frame and said lower section of said frame bearing against a bottom of said connecting link, said lead screw having a handle adapted for grasping and rotation by a remotely operated vehicle;
b) with an operating arm of a remotely operated vehicle, grasping said handle section of said connecting link pin retaining apparatus;
c) with said remotely operated vehicle, moving said connecting link pin retaining apparatus into engagement with said connecting link, with said locator pin engaging a hole in a bottom of said connecting link;
d) rotating said connecting link pin retaining apparatus into position around said connecting link so that said connecting link is positioned between said upper and lower sections of said frame, and said lead screw is substantially aligned with said connecting link pin; and
e) rotating said lead screw with an operating arm of said remotely operated vehicle, thereby advancing said lead screw against said connecting link pin.

14. A connecting link pin retaining device, comprising:
a frame sized and shaped to fit around a connecting link disposed in a subsea mooring line; and
a means for moving a retaining member against a link pin in said connecting link, wherein said means for moving a retaining member against a link pin in said connecting link comprises a pair of hingedly connected arms having curved ends to accommodate said connecting link, a lead screw joining said arms whereby rotation of said lead screw brings said ends together, and whereby a retaining member on one of said arms is positioned to bear against a connecting link pin when said connecting link is disposed in position in said arms.

* * * * *